United States Patent [19]

Filipovich

[11] Patent Number: 5,416,315

[45] Date of Patent: May 16, 1995

[54] VISOR-MOUNTED NIGHT VISION SYSTEM

[75] Inventor: Danny Filipovich, Lincolnwood, Ill.

[73] Assignee: Night Vision General Partnership, Lincolnwood, Ill.

[21] Appl. No.: 184,916

[22] Filed: Jan. 24, 1994

[51] Int. Cl.⁶ .............................................. H01J 40/14
[52] U.S. Cl. ................... 250/214 VT; 313/524
[58] Field of Search ............. 250/214 VT, 216; 313/524; 359/409; 378/41

[56] References Cited

U.S. PATENT DOCUMENTS

| | | | |
|---|---|---|---|
| 2,710,560 | 6/1955 | Thompson | 88/33 |
| 3,454,773 | 7/1969 | Bulthuis et al. | 250/213 |
| 3,781,560 | 12/1973 | DeBurgh et al. | 250/333 |
| 3,787,688 | 1/1974 | Stone | 250/213 |
| 4,000,419 | 12/1976 | Crost et al. | 250/213 |
| 4,323,298 | 4/1982 | Brennan | 350/36 |
| 4,376,889 | 3/1983 | Swift | 250/213 |
| 4,449,787 | 5/1984 | Burbo et al. | 350/538 |
| 4,463,252 | 7/1984 | Brennan et al. | 250/213 |
| 4,468,101 | 8/1984 | Ellis | 350/538 |
| 4,563,061 | 1/1986 | Ellis | 350/503 |
| 4,653,879 | 3/1987 | Filipovich | 350/538 |
| 4,655,562 | 4/1987 | Kreitzer et al. | 350/538 |
| 4,660,943 | 4/1987 | Ellis | 350/538 |
| 4,697,783 | 10/1987 | Kastendieck et al. | 248/900 |
| 4,775,217 | 10/1988 | Ellis | 350/538 |
| 4,907,296 | 3/1990 | Blecha | 2/6 |
| 4,915,487 | 4/1990 | Riddell, III et al. | 350/174 |
| 4,918,752 | 4/1990 | Briggs | 2/6 |
| 4,922,550 | 5/1990 | Verona et al. | 2/6 |
| 4,934,793 | 6/1990 | Klein | 350/345 |
| 4,987,608 | 1/1991 | Cobb | 2/6 |
| 5,079,416 | 1/1992 | Filipovich | 250/213 |
| 5,093,567 | 3/1992 | Staveley | 250/221 |
| 5,229,598 | 7/1993 | Filipovich | 250/213 |
| 5,254,842 | 10/1993 | Filipovich et al. | 250/214 |
| 5,307,204 | 4/1994 | Dor | 250/214 VT |

FOREIGN PATENT DOCUMENTS

| | | |
|---|---|---|
| 066402 | 12/1982 | European Pat. Off. . |
| 252200 | 1/1988 | European Pat. Off. . |
| 2006463A | 5/1979 | United Kingdom . |

OTHER PUBLICATIONS

ITT Defense Corporation Specification: "Modular Ejection-Rated Lowprofile, Imaging for Night (Merlin) Aviator Goggle" Sep. 1989.

Primary Examiner—David C. Nelms
Attorney, Agent, or Firm—Willian Brinks Hofer Gilson & Lione

[57] ABSTRACT

A night vision visor system that is compact, light in weight, and ejection-safe, and which provides the user with an unobstructed peripheral field of view and other structural and operational advantages. The night vision visor system includes a visor adapted to be mounted to a helmet to be worn by a user and to be positioned substantially in front of the user's face, and a night vision imaging apparatus mounted to the visor for receiving incoming visible and/or infrared light from an object, for converting the incoming light to an intensified visible light, and for presenting the intensified visible light to an eye of the user. The night vision imaging apparatus includes first and second night vision imaging devices mounted in openings in the visor and movable with the visor between a down position in front of the user's face when is use and a raised position away from the user's face when not in use.

21 Claims, 5 Drawing Sheets

VISOR-MOUNTED NIGHT VISION SYSTEM

BACKGROUND OF THE INVENTION

1. Field of the Invention

The present invention relates generally to night vision systems of the type which permit vision under very low light conditions by converting incoming infrared and/or visible light from a viewed object to an intensified visible light. More particularly, the present invention relates to a night vision visor system that is compact, light in weight and ejection-safe; and which provides the user with a totally unobstructed peripheral field of view and numerous additional structural and operational advantages.

2. Background Art

Night vision goggles are commonly used by aircraft pilots and others to permit vision under very low light conditions by converting incoming infrared and/or visible light from a viewed object to an intensified visible light.

Prior night vision goggles were typically heavy, cumbersome and unstable. They often resembled television cameras mounted on the user's head, protruding more than 175 mm from the user's eyes, and weighing as much as 850 grams. The weight and front-to-back length of such goggles exerted large moments on the user's head, causing serious instability problems and prevented their safe use in many applications where the user's head was likely to be subjected to high gravitational or centrifugal loads. In emergency situations, for example, when ejecting from an aircraft, there was often not sufficient time to remove the goggles before ejection; and the very substantial forces encountered during the ejection were extremely dangerous to the user.

Night vision goggles are frequently mounted to a helmet adapted to be worn by the user. Helmet-mounted goggles avoid the discomfort sometimes encountered when the goggles are attached directly to the head of the user and provide various other advantages; however, prior helmet-mounted systems also suffer from several inadequacies. For example, in many systems, the structure of the goggles obstructs the user's normal peripheral vision, and thus reduces his peripheral field of view. Many systems also interfere with the proper use of a visor which should generally be positioned in front of the eyes at all times, and other necessary equipment such as an oxygen mask or the like. Many systems are also rather complicated in design, difficult to adjust and generally inconvenient to use.

U.S. Pat. No. 5,254,852 describes a helmet-mounted night vision goggles system that is generally effective in overcoming the above-described inadequacies of the prior art. This patent describes a system in which a compact, light-weight night vision goggles apparatus and a helmet-mounted visor cooperate with one another to ensure that the visor will remain in position in front of the goggles and in front of the user's face to help protect the user, even if the goggles are worn during ejection from an aircraft.

In addition, the night vision goggles apparatus of U.S. Pat. No. 5,254,852 includes first and second housings adapted to substantially cover the left and right eyes, respectively, of the user when the apparatus is in use, and each of the housings contains an optical imaging system for presenting an intensified visible image of a viewed object to a respective eye of the user. The optical imaging systems each include an objective lens system having a light input positioned above the eyes and adjacent a side of the face behind a vertical plane through the eyes so as to not significantly obstruct the normal peripheral vision of the user.

Although, as indicated above, the night vision goggles system of U.S. Pat. No. 5,254,852 is generally effective in overcoming many of the inadequacies of prior art goggles, the system was found not to be fully satisfactory in certain applications.

In particular, the interpupillary distance between a person's eyes is normally about two and one-half inches, and the brain is accustomed to interpreting images received by the two eyes at that spacing. In the system of U.S. Pat. No. 5,254,852, however, the light inputs of the objective optical systems for the two eyes are adjacent opposite sides of the user's head; and, therefore, are more widely spaced than the eyes. This wider spacing between the light inputs for the two eyes results in an effect known as the "hyper-stereo effect" and results in viewed objects appearing somewhat closer than they really are. This effect can become a problem in certain applications such as during landing of an aircraft, for example, on an aircraft carrier or other restricted space.

In addition, night vision systems are typically worn by aircraft pilots who view the surrounding environment through a windscreen which is often quite small and also substantially curved around the edges thereof. Because of the wide spacing between the light inputs of the objective optical systems, the pilot may often have to move his head to one side or the other to avoid looking through the curved portions of the windscreen, which may cause distortion, or to prevent his view from being obstructed by the frame of the windscreen.

SUMMARY OF THE INVENTION

The present invention provides a night vision visor system which comprises a night vision apparatus mounted to a helmet-mounted visor that is compact, extremely light in weight and ejection-safe; and that provides an unobstructed peripheral field of view to the user and which avoids the above-described "hyper-stereo effect" that results in viewed objects appearing closer than they are.

A night vision visor system according to the present invention comprises a visor adapted to be mounted to a helmet or other headgear to be worn by a user and to be positioned substantially in front of the user's face, and a night vision imaging apparatus mounted to the visor for receiving incoming visible and/or infrared light from an object, for converting the incoming light to an intensified visible light, and for presenting the intensified visible light to an eye of the user.

In accordance with the present invention, the night vision imaging apparatus is mounted directly to a helmet-mounted visor and is movable with the visor between a down position in front of the eyes of the user during use, and an up position away from the user's face when not in use. This permits the night vision visor system to be conveniently used by aircraft pilots and others. Also, when the night vision imaging apparatus of the present invention is positioned in front of the user's face during use, the visor is automatically also positioned in front of the user's face and in front of the imaging apparatus to protect the user in case of an emergency situation such as ejection from an aircraft.

According to a presently preferred embodiment, the night vision imaging apparatus of the night vision visor system includes first and second night vision imaging devices mounted to the visor such that each will be positioned in front of a respective eye of the user when the visor is in the down position in front of the user's face. The objective optical system of each imaging device includes a light input portion which extends through an opening in the visor so as to provide an unobstructed view of the surrounding environment without having to look through the visor itself.

The light input portion of the objective optical system of each device is also positioned substantially directly above its respective eye when the visor is in the down position, and the devices are configured such that there will be essentially no obstruction of the user's normal peripheral field of view. Also, because the light input portions of the objective optical systems are positioned substantially directly above the eyes of the user, they are spaced from one another by about the same distance as the user's interpupillary distance. Therefore, the "hyper-stereo effect" is avoided and viewed objects appear at their true distance.

According to another aspect of the invention, means are also provided to adjust the spacing between the eyepiece optical systems of the first and second night vision imaging devices to accommodate the interpupillary distance of any user.

In general, the night vision visor system of the present invention is extremely light in weight (i.e., fully one-third the weight of many conventional systems), is directly attachable to existing helmet designs, and is easy and convenient to use and handle.

Further advantages and specific details of the present invention will become apparent hereinafter in conjunction with the following detailed description of presently preferred embodiments.

DETAILED DESCRIPTION OF THE PREFERRED EMBODIMENTS

Figure 1:
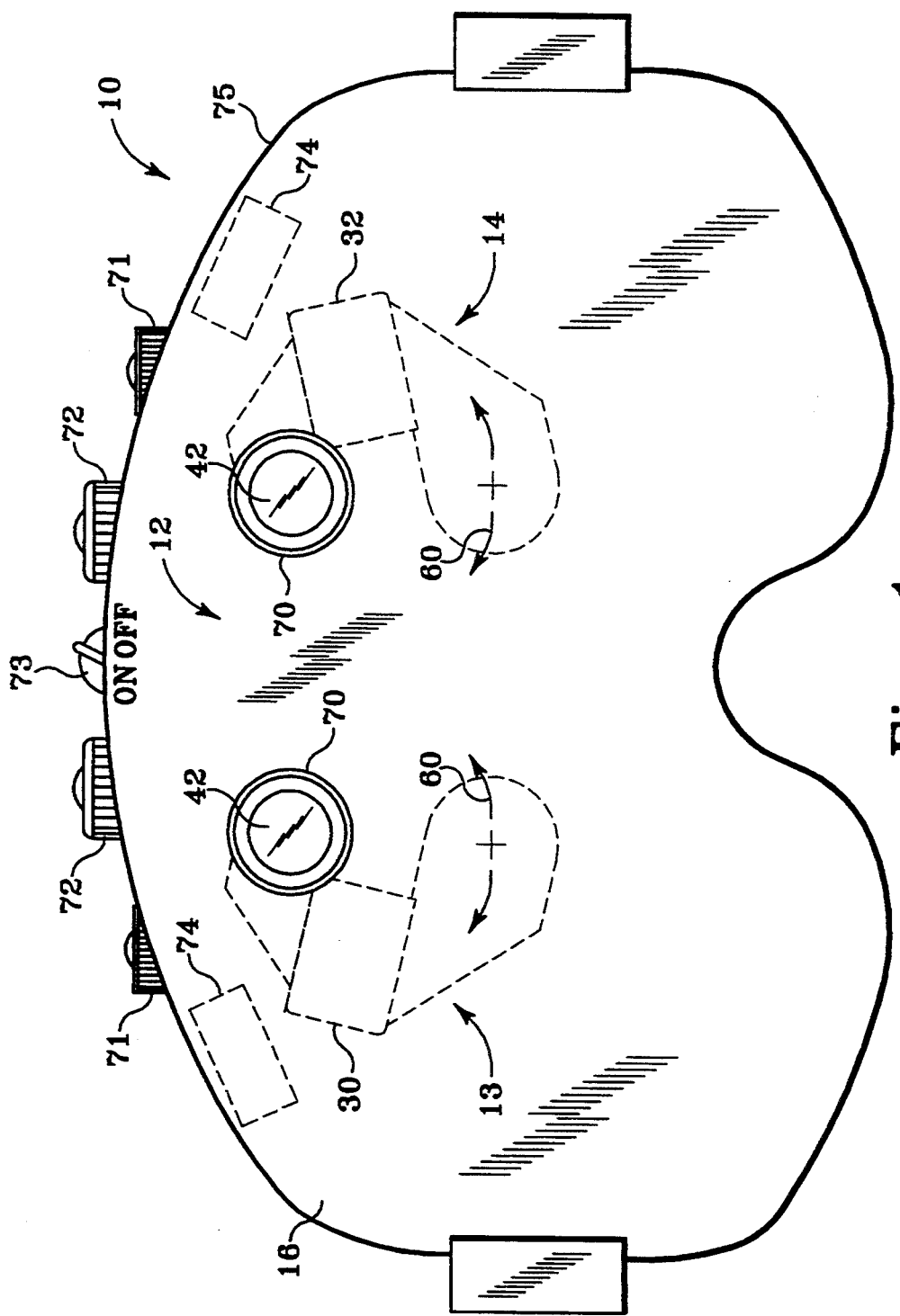
FIG. 1 is a schematic front view of a night vision visor system according to a presently preferred embodiment of the invention.
Figure 2:
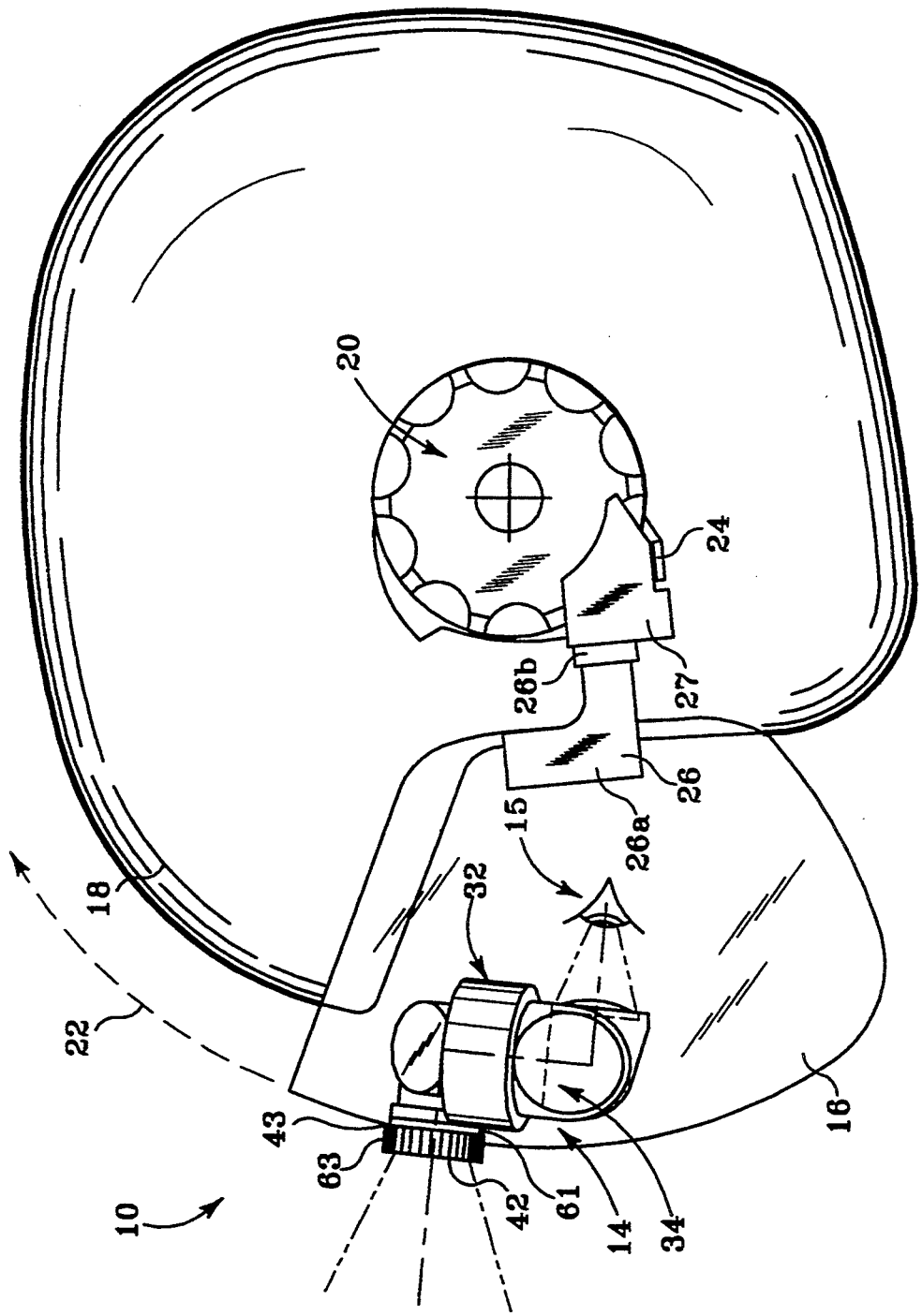
FIG. 2 is a left side view of the night vision visor system of FIG. 1 affixed to a helmet.
Figure 3:
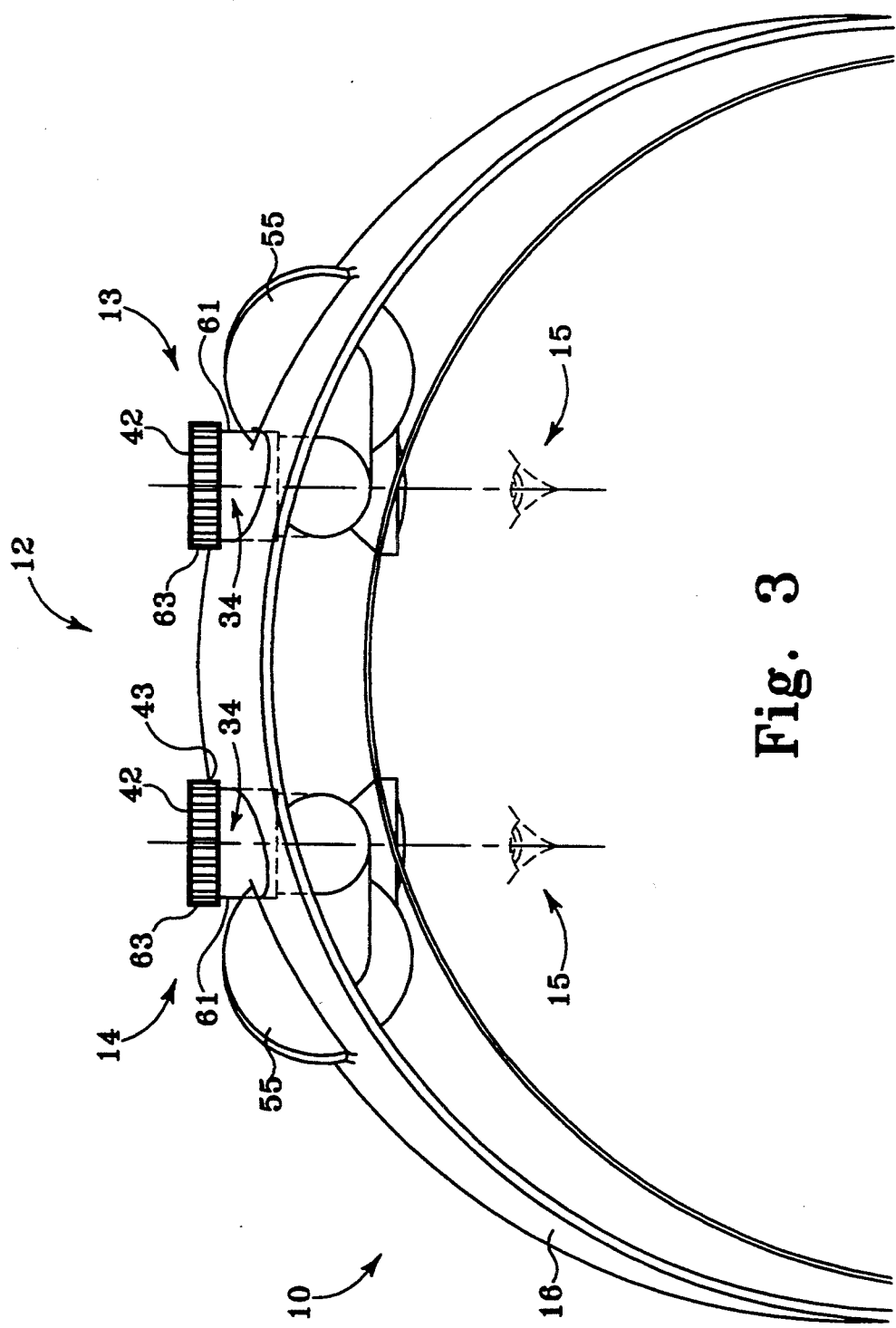
FIG. 3 is a top view of the night vision visor system of FIGS. 1 and 2.

FIGS. 1-3 are front, side and top views, respectively, schematically illustrating a night vision visor system according to a presently preferred embodiment of the invention. The night vision visor system is generally designated by reference numeral 10 and includes a night vision imaging apparatus generally designated by reference numeral 12 mounted to a visor 16. As illustrated in the FIGS., night vision imaging apparatus 12 includes first and second night vision imaging devices 13 and 14 which are adapted to be positioned generally in front of the eyes 15 of the user when the visor is positioned in front of the user's face as shown in FIGS. 2 and 3.

Visor 16 having night vision imaging apparatus 12 mounted thereto is adapted to be affixed to a helmet 18 which may be of conventional type as commonly worn, for example, by pilots of high-performance aircraft and the like.

As best shown in FIG. 2, visor 16 is affixed to helmet 18 by a generally conventional mounting mechanism 20 provided on each side of the helmet 18. As is well-known to those skilled in the art, mounting mechanism 20 is rotatable so as to permit the visor to be moved between a down position in front of the user's face as shown in FIG. 2, and an up or raised position indicated by dashed arrow 22 at which the visor is above the face of the user. A stop element 24 is provided on each mechanism 20 to define the down position of the visor, and is itself movable up and down to adjust the down position of the visor to the requirements of a particular user.

As also shown in FIG. 2, the visor 16 is attached to each mechanism 20 by leg or bracket-shaped member 26 which is received within a connecting member 27. Bracket member 26 is adjustable inwardly and outwardly relative to connecting member 27 to adjust the position of the visor fore and aft relative to the user's face.

In addition, bracket-shaped member 26 comprises spring-loaded telescoping portions 26a and 26b. The telescoping portions of member 26 permit the visor 16 to be pulled outwardly away from the face by a distance of, for example, one-fourth to one-half inch to enable the night vision imaging apparatus 12 mounted thereon to clear the helmet 18 when the visor is moved to its raised position.

First and second night vision imaging devices 13 and 14 include first and second housings 30 and 32, respectively, arranged to cover the right and left eyes, respectively, of the user when the visor is in its down position in front of the user's face. Each housing 30 and 32 supports an optical imaging system 34 designed to receive infrared and/or visible light from an external object and to present an intensified visible image of the object to its respective eye of the user.

Figure 4:
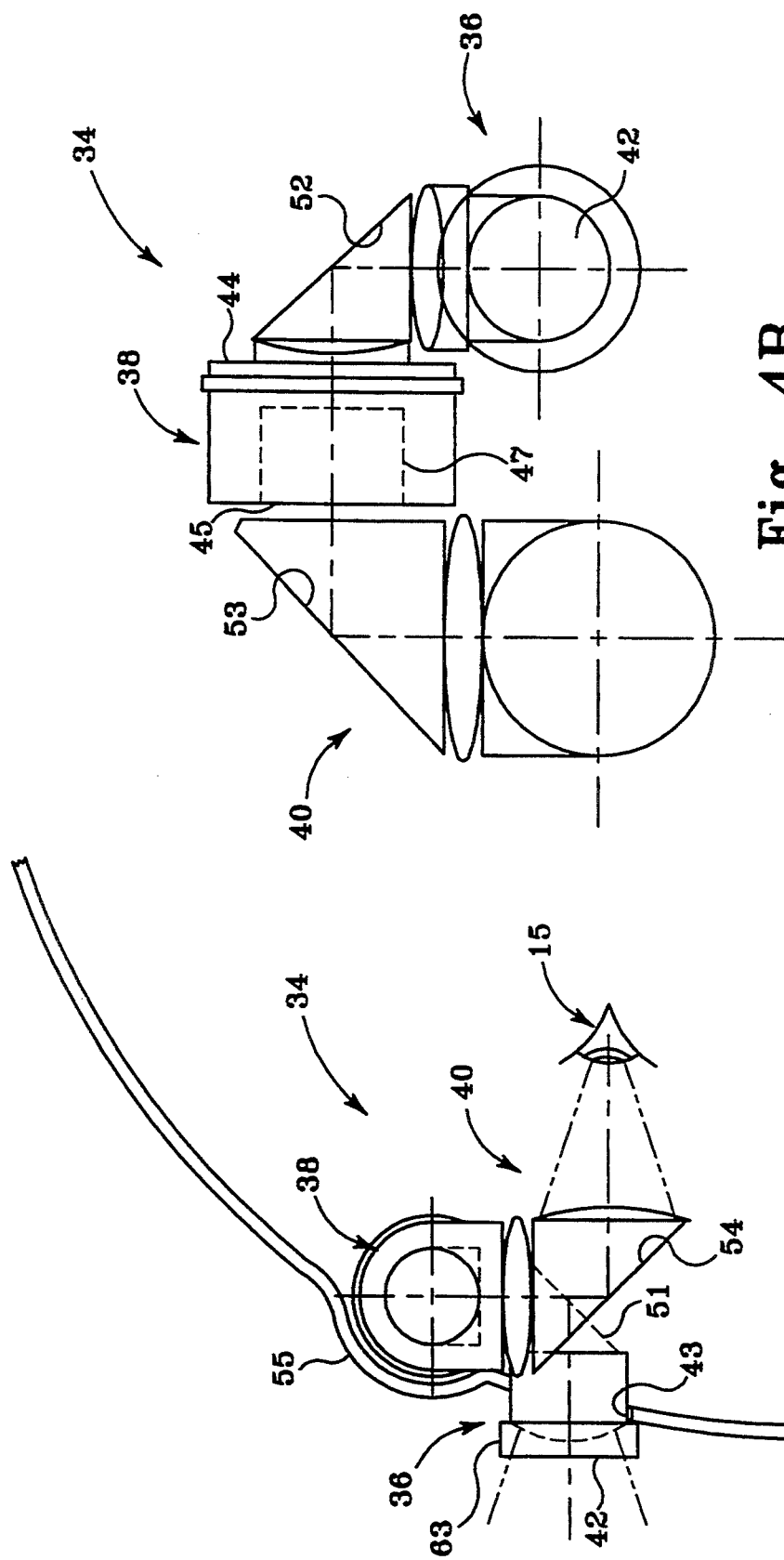
FIGS. 4A and 4B schematically illustrate details of the optical imaging systems of the night vision visor system of FIGS. 1-3.

The optical imaging systems in housings 30 and 32 are substantially mirror duplicates of one another; and, thus, only one is described in detail herein. In particular, FIGS. 4A and 4B schematically illustrate optical imaging system 34 in left eye housing 32.

Optical imaging system 34 generally includes an objective optical system 36, an image intensifier tube 38 and an eyepiece optical system 40. Objective optical system 36 is adapted to collect infrared and/or visible light from an external object at an input end 42 thereof and to present an image of the object to the input end or photocathode side 44 of the image intensifier tube 38. The image intensifier tube converts the image at the input end thereof to an intensified visible image in a narrow band of wavelengths at the output end 45 thereof.

In a preferred embodiment, the image intensifier tube includes a GaAS photocathode at the input end, and the output light from the image intensifier is emitted by a green phosphor producing a visible band of light which is known as "P-20" light, although it will be appreciated that other image intensifier constructions could also be used. The image intensifier can, for example, comprise an 18 mm cathode, 7 micron tube, although other tube designs can also be utilized, if desired. The tube includes a straight fiber optic bundle 47 therein to transmit light from the photocathode to the phosphor.

The intensified visible image at the output end 45 of the image intensifier tube 38 is applied to the eyepiece optical system 40 which presents an intensified visible image of the object to an eye 15 of the user at unity magnification.

As best shown in FIGS. 1 and 2, the objective optical systems 36 of first and second imaging devices 13 and 14, in general, and the input ends 42 thereof, in particular, are positioned substantially directly above the eyes of the user when the visor 16 is in its down position in front of the user's face. In addition, the input ends 42 of the imaging devices 13 and 14 are spaced from one another by substantially the same distance as the interpupillary distance between the eyes 15 of the user. As a result, the "hyper-stereo effect" encountered in prior night vision systems is avoided, and objects viewed through the night vision imaging apparatus appear substantially at their true distance. Also, the present invention avoids the problem described previously of users being required to move their head to avoid viewing an object through highly curved areas of a jet windscreen or to avoid obstructions such as the frame of an aircraft windscreen.

As shown in the FIGS., a portion 61 of each objective optical system 36 of each imaging device 13 and 14 adjacent the input end 42 extends through an opening 43 provided in the visor 16 such that light entering into the optical systems does not have to first pass through the visor, thus avoiding any distortion or other image degradation that might be caused by the visor. An adjustment ring 63 is preferably provided on each portion 61 to permit focus adjustment of the objective optical system.

Light entering into objective optical system input 42 is turned first toward the side of the face and then downwardly via a pair of reflective surfaces 51 and 52, for example, mirror or prism surfaces, incorporated into the objective optical system, to be directed to the input end 44 of the image intensifier tube 38. The visible intensified light from the output end 45 of the image intensifier tube is turned toward the center of the face and then rearwardly to the eye 15 of the user via reflective surfaces 53 and 54 in the eyepiece optical system. The eyepiece optical system may comprise, for example, a 21 mm EFL eyepiece and the objective optical system may comprise a 21 mm EFL objective. The design of the system is such as to provide eye relief of, for example, 20–25 mm.

As best shown in FIGS. 3 and 4A, the visor is formed to have outwardly protruding bubble portions 55 within which a portion of the structure of the night vision imaging devices 13 and 14 are adapted to be received.

The overall design of the optical imaging system of the present invention is such that it does not obstruct the user's normal peripheral vision. With the visor 16 in position in front of the user's face, each eye has a peripheral field of view of nearly 360 degrees, and the two eyes together provide a fully unobstructed peripheral field of view. This is an important feature of the present invention inasmuch as in many prior night vision systems, the position of the optical structures thereof are such that they obstruct normal peripheral vision to a significant extent, and thus interfere with the ability of a user to properly view HUD displays, cockpit instruments, and the like while wearing the system.

It should be recognized that the specific optical design of the objective and eyepiece optical systems can be varied in numerous ways as is well-known by those skilled in the art, and the design of FIGS. 4A and 4B is intended to be exemplary only of a suitable design.

The objective optical systems 36 of night vision imaging devices 13 and 14 are fixed in position to the visor 16. However, as schematically illustrated by arrows 60 in FIG. 1, the eyepiece optical systems of each device are adjustable by adjustment knobs 71 to match the interpupillary distances of the user. This is preferably accomplished by mounting the objective optical systems 36 within cylindrical bearings 70 carried by the openings 43 in the visor 16 so that the housings are rotatable therein. As shown in FIG. 1, the eyepiece optical systems can be moved between a spacing of about 52 mm to a spacing of about 72 mm to accommodate the interpupillary distances of substantially all users.

Thus, with the present invention, a user can put on his helmet, move the visor to its down position in front of the face, and then quickly and easily adjust the spacing between the eyepiece optical systems of the two devices 13 and 14 by rotating adjusting knobs 71 mounted to the visor to match his interpupillary distance.

As also shown in FIG. 1, the visor can also carry batteries 72, an on-off power switch 73, high-power voltage supplies 74 for the image intensifier tubes 38 as well as other appropriate structures. These can conveniently be carried on a ledge portion or other strengthened portion formed at the top of the visor.

Figure 5:
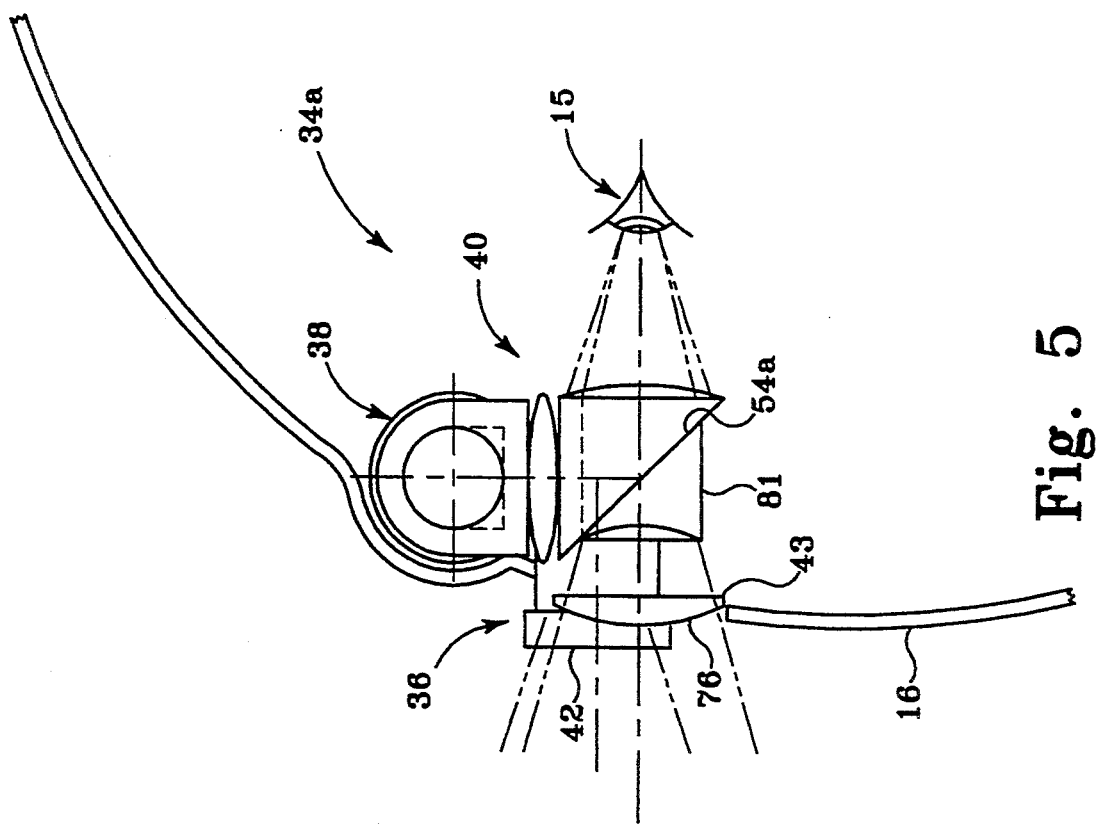
FIG. 5 schematically illustrates an optical imaging system of a night vision visor system of the "see-through" type according to an alternative embodiment of the invention.

The night vision imaging device 14 shown in FIGS. 4A and 4B comprises a "non-see-through" type imaging device in which only an intensified visible image of an external object is presented to an eye of the user. The present invention can also employ an optical imaging system of the "see-through" type wherein both an intensified image and an unintensified visible image of an object are presented to the eye of the user. FIG. 5 illustrates a "see-through" type optical imaging system of the present invention.

As shown in FIG. 5, the see-through version is similar to the non-see-through version, but additionally includes a see-through channel 81 for receiving incoming light and for directing the incoming light directly to the eye of the user. The input end 76 of the see-through channel is preferably positioned to be directly behind the visor, and surface 54a in this embodiment is such that it will both transmit the light from input 76 and reflect the intensified light from image intensifier tube 38 to the eye of the user.

The see-through channel comprises, essentially, a unity power telescope providing approximately a 35–40 degree field of view which permits HUD displays and the like to be readily viewed by the user while wearing the system.

While what has been described constitutes presently preferred embodiments, it should be understood that the invention could take numerous other forms. Accordingly, it should be recognized that the invention should be limited only insofar as is required by the scope of the following claims.

I claim:

1. A night vision visor system comprising:
   a visor adapted to be mounted to headgear to be worn by a user and adapted to be positioned substantially in front of the user's face; and a night vision imaging apparatus mounted to said visor for receiving incoming visible and/or infrared light from an object, for converting the incoming light to an intensified visible light, and for presenting the intensified visible light to an eye of the user.

2. The night vision visor system of claim 1 wherein said visor includes an opening extending therethrough, and wherein said system includes means for mounting said night vision imaging apparatus in said opening.

3. The night vision visor system of claim 2 wherein said night vision imaging apparatus includes an objective optical system having a light input for receiving said incoming light; and wherein a portion of said objective optical system is positioned in said opening for receiving said incoming light from said object at said light input without said incoming light first passing through said visor.

4. The night vision visor system of claim 3 wherein said opening is positioned substantially above an eye of the user when said visor is positioned in front of the user's face for supporting the light input of said objective optical system above said eye.

5. The night vision visor system of claim 2 wherein said night vision imaging apparatus includes a housing supporting an objective optical system for receiving said incoming light from said object, at least a portion of said objective optical system being positioned in said opening in said visor, an image intensifier tube for converting an image presented by said objective optical system to an input end thereof to an intensified visible image at an output end thereof, and an eyepiece optical system for presenting the intensified visible image at the output end of the image intensifier tube to an eye of the user; and wherein said image intensifier tube and said eyepiece optical system are positioned between said visor and the user's face when said visor is positioned in front of the user's face.

6. The night vision visor system of claim 5 wherein said mounting means includes means for rotatably mounting said night vision imaging apparatus in said opening.

7. The night vision visor system of claim 1 wherein said night vision imaging apparatus includes first and second night vision imaging devices mounted to said visor, each for receiving incoming visible and/or infrared light from an object, for converting the incoming light to an intensified visible light, and for presenting the intensified visible light to a respective eye of the user.

8. The night vision visor system of claim 7 wherein said visor includes first and second openings extending therethrough, and wherein said system includes means for mounting said first and second night vision imaging devices in said first and second openings, respectively.

9. The night vision visor system of claim 8 wherein each of said night vision imaging devices includes an objective optical system mounted in a respective one of said openings for receiving incoming visible and/or infrared light from said object at a light input thereof, an image intensifier tube for converting an image presented by said objective optical system to an input end thereof to an intensified visible image at an output end thereof, and an eyepiece optical system for presenting the intensified visible image at the output end of the image intensifier tube to a respective eye of the user.

10. The night vision visor system of claim 9 wherein said first and second openings are positioned substantially above the respective eyes of the user when the visor is in front of the user's face for positioning the light inputs of said objective optical systems substantially above the eyes of the user.

11. The night vision visor system of claim 10 wherein the light inputs of the objective optical systems of the first and second imaging devices are spaced from one another by approximately the same distance as the eyes of the user.

12. The night vision visor system of claim 10 and further including means for adjusting the positions of the eyepiece optical systems of said first and second night vision imaging devices to accommodate the interpupillary distance of the user.

13. The night vision visor system of claim 12 wherein said adjusting means comprises manual adjusting means on said visor.

14. The night vision visor system of claim 1, and further including means for mounting said visor to said headgear for movement between a first, down position substantially in front of the user's face and a second, raised position away from the user's face, and wherein said night vision imaging apparatus is movable with said visor between said first and second positions.

15. The night vision visor system of claim 14 wherein said means for mounting said visor to said headgear includes means for pulling said visor outwardly of said face for clearing said headgear when said visor is moved from said first, down position to said second, raised position.

16. A night vision visor system comprising:
a visor adapted to be mounted to headgear to be worn by a user and adapted to be positioned substantially in front of the user's face; and
night vision imaging apparatus mounted to said visor, said night vision imaging apparatus including first and second night vision imaging devices adapted to be positioned substantially in front of first and second eyes of the user when the visor is positioned in front of the user's face, each of said first and second night vision imaging devices including means for receiving incoming visible and/or infrared light from an object, for converting the incoming light to an intensified visible light, and for presenting the intensified visible light to a respective eye of the user.

17. The night vision visor system of claim 16 wherein said visor includes first and second openings extending therethrough, and wherein said system includes means for mounting said first and second night vision imaging devices in said first and second openings, respectively.

18. The night vision visor system of claim 17 wherein each of said night vision imaging devices includes an objective optical system positioned in a respective one of said openings for receiving incoming light from said object at a light input thereof, an image intensifier tube for converting an image presented by said objective optical system to an input end thereof to an intensified visible image at an output end thereof, and an eyepiece optical system for presenting the intensified visible image at the output end of the image intensifier tube to a respective eye of the user.

19. The night vision visor system of claim 18 wherein said first and second openings are positioned above the respective eyes of the user when the visor is in front of the user's face for positioning the light inputs of said objective optical systems above the eyes of the user.

20. The night vision visor system of claim 19 wherein said first and second openings are spaced from one another by approximately the same distance as the eyes of the user.

21. The night vision visor system of claim 19 and further including means for adjusting the positions of the eyepiece optical systems of said first and second night vision imaging devices to accommodate the interpupillary distance of the user.

* * * * *